FIG. I

INVENTOR.
HANS P. BOSWAU
HARVEY W. CLAUSEN
BY C. A. Gulbrandsen
ATTY.

May 8, 1962 H. P. BOSWAU ET AL 3,033,942

CORDLESS SWITCHBOARD

Filed July 1, 1957 6 Sheets-Sheet 2

INVENTOR.
HANS P. BOSWAU
HARVEY W. CLAUSEN

BY C. A. Gulbrandsen

ATTY.

May 8, 1962 H. P. BOSWAU ET AL 3,033,942

CORDLESS SWITCHBOARD

Filed July 1, 1957 6 Sheets-Sheet 3

INVENTOR.
HANS P. BOSWAU
BY HARVEY W. CLAUSEN
C. A. Gulbrandsen
ATTY.

May 8, 1962 H. P. BOSWAU ET AL 3,033,942

CORDLESS SWITCHBOARD

Filed July 1, 1957 6 Sheets-Sheet 4

INVENTOR:
HANS P. BOSWAU
HARVEY W. CLAUSEN

BY C. A. Gulbrandsen
ATTY.

May 8, 1962 H. P. BOSWAU ET AL 3,033,942

CORDLESS SWITCHBOARD

Filed July 1, 1957 6 Sheets-Sheet 5

INVENTOR.
HANS P. BOSWAU
BY HARVEY W. CLAUSEN
C. A. Gulbrandsen
ATTY.

INVENTOR.
HANS P. BOSWAU
HARVEY W. CLAUSEN
BY C. A. Gulbrandsen
ATTY.

3,033,942
CORDLESS SWITCHBOARD
Hans P. Boswau, Los Altos, Calif., and Harvey W. Clausen, Genoa, Ill., assignors to Leich Electric Company, Genoa, Ill., a corporation of Illinois
Filed July 1, 1957, Ser. No. 669,279
17 Claims. (Cl. 179—91)

This invention relates to telephone switchboards used to provide telephone service between local stations as well as between these stations and trunk lines connected to a manual or dial central office. More particularly it relates to manually operated switchboards of the type known as cordless PBX switchboards, which are attendant operated by means of toggle keys to effect linkage between a calling party and a called party.

The conventional cordless PBX switchboard has a plurality of keys, switches and circuits for each station line and central office trunk line. The purpose of such plurality or duplication is to multiply the number of available conversation channels and connecting links accessible to each station or trunk. Such an arrangement is comparable in function to the standard cord type switchboard wherein each station and trunk has a cord which is plugged into jacks providing the connecting linkage. Thus the visual selection of idle or available conversation channels and the inherent versatility of the station or trunk cords heretofore enabled simple direct connection of the calling and called parties. Obviously, the cordless switchboard, as presently constituted without the transposition faculty of the cords, represents a compromise device wherein the elimination of unsightly cords, plugs and jacks necessitated a duplication of components and increased complexity of wiring. Miniaturization of parts and improved assembly techniques have offset this deficiency to a limited degree. Therefore, it is an object of this invention to provide the desirable transition from the cord type switchboard to a cordless switchboard wherein a marked degree of compactness, versatility, minimal amount of components, and simplicity is attained. This object is accomplished by a novel arrangement of keys and related mechanical and electrical components in a cordless type switchboard whereby a plurality of switching functions is obtainable from individual keys; and common elements of the stations, trunks, and conversation channels are arranged in multiple strips cooperatively disposed relative to each other and to the keys. The attainment of this object results in the elimination of duplicate wiring, hundreds of soldered connections and break contacts used heretofore.

Another object of the invention is to provide a cordless switchboard having electrical and mechanical components which are standard, interchangeable and adaptable for removal and insertion to expand or contract the available capacity of the board to encompass the requirements of different applications for telephone systems using such switchboards.

A further object of the invention is to provide a novel toggle arrangement of the keys wherein a key biasing spring also serves to retain the key and related components in assembled relationship. Additionally, the novel toggle arrangement provides a dual spring position which permits key operation in two different functional applications, i.e., one, for positive overcenter key actuation with spring bias in two opposite directions, and two, unilateral key actuation with spring bias in one direction.

These and further objects will be more particularly explained in the following description, in which FIG. 1 is a top plan view of the switchboard with the cover removed, partly in section, and illustrating the operable portion generally visible to the attendant.

Figure 1:
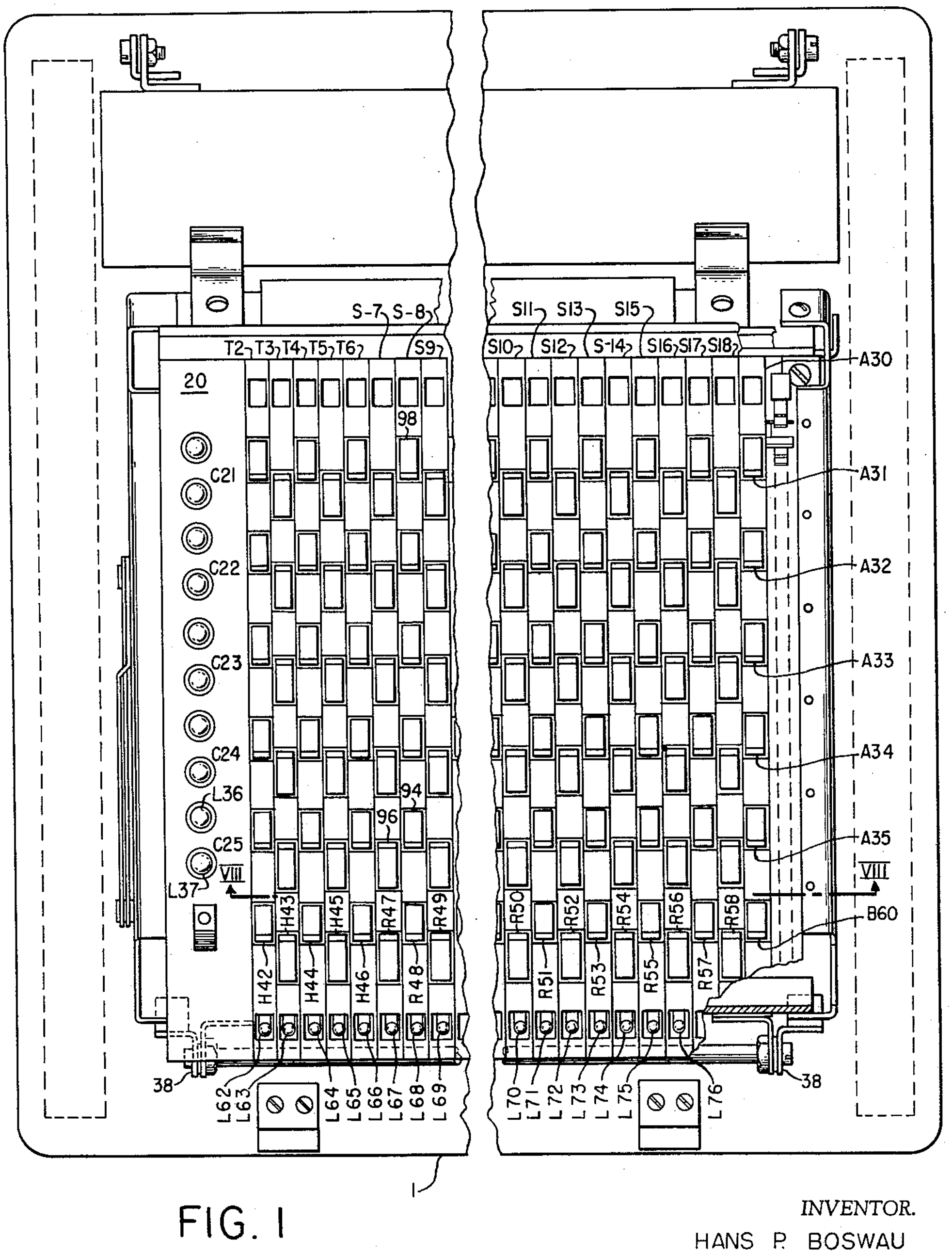

Referring now to FIG. 1 there is shown a switchboard 1 having a keyboard 20 thereon which has capacity for five central office trunks T2 to T6 inclusive and at least twelve local extensions or stations S7 to S18 inclusive. These trunk and station designations refer to vertical key strips and a plurality of keys on each strip which serve the particular trunk or station. Each trunk and station (including the attendant's station A30) has a representative key present in each of five conversation channels or connecting circuits C21 to C25 inclusive, horizontally arranged in rows on the keyboard 20. The five conversation channels C21 through C25 provide five available connecting circuits for linkage between a calling party and a called party. For example, the attendant's station A30, which is functionally comparable to the trunks and other stations, has key A31 in channel C21 and key A32 in channel C22, etc., which enables the attendant's handset to be connected into any one of the plurality of connecting circuits or conversation channels C21 through C25.

The lowest horizontal row of keys (below channel C25) serves semi-independent functions with relation to the upper five rows of keys, i.e., this row is disassociated from the channels C21–C25 but has common connections with the corresponding trunks or stations, in a manner to be further described hereinafter. This row includes trunk hold keys H42 through H46, ringing keys R47 through R58, and a buzzer key B60.

The trunk hold keys H42 to H46 inclusive permit the attendant to hold a trunk line at the switchboard for the following purposes; to answer another call, to "split" an incoming call (i.e., announce the call or obtain information without being overheard by the calling party), and to limit outgoing calls to one at a time so that the calling party cannot disconnect the trunk connection. The ringing keys R47 to R58 inclusive, permit the attendant to signal a called party on any of the corresponding stations irrespective of whether or not the calling party is another station or a trunk call. The buzzer key B60 permits the attendant to obtain an audible signal which aids the visual lamp signals or calls attention to an unattended switchboard. The lowest row of keys, above described, are conventional accessories for a switchboard which may be present in various combinations depending upon the particular requirements of the system.

Each trunk and station has means for indicating a condition of its line which includes vertically corresponding lamps L62 through L76 (lamps for S17 and S18 not shown) which, when lighted, visually indicate incoming calls emanating from one of the central office trunk lines or local stations. Each of the five conversation channels C21 through C25 is provided with means for indicating a condition of its connecting circuit which includes a pair of horizontally corresponding lamps, for example L36 and L37 for channel C25, which, when lighted, visually indicate a busy channel (upper lamp of each pair) and supervisory attention (lower lamp of each pair).

Figure 2:
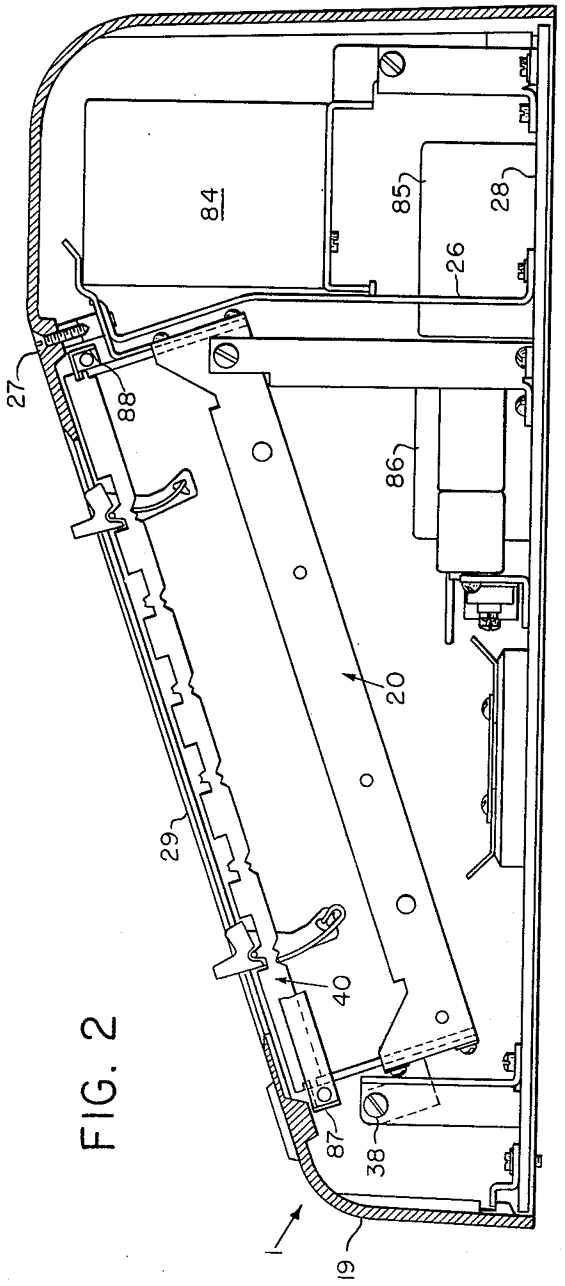
FIG. 2 is a side view of the switchboard, partly in section, illustrating the assembly and maintenance arrangement.

As shown in FIG. 2, the switchboard 1 is provided with a removable cover 19 secured to a bracket 26 by means of screws 27 (one of which is shown). The bracket 26 is attached by screws or similar means to the base 28. An aperture 29 in the cover 19 provides an opening for the key shelf 40 of keyboard 20. The keyboard 20 is pivotally mounted on hinges 38 to permit ready access to the wiring and mechanical components located beneath the keyboard 20. Relays and other conventional accessory apparatus are housed within containers 84, 85 and 86.

Figure 3:
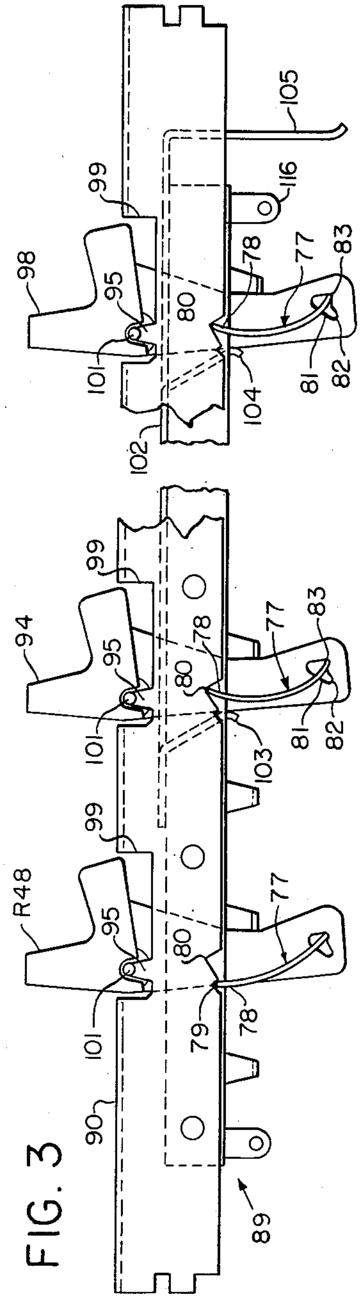
FIG. 3 is a side view of a multiple key strip individual to a single station line.
Figure 7:
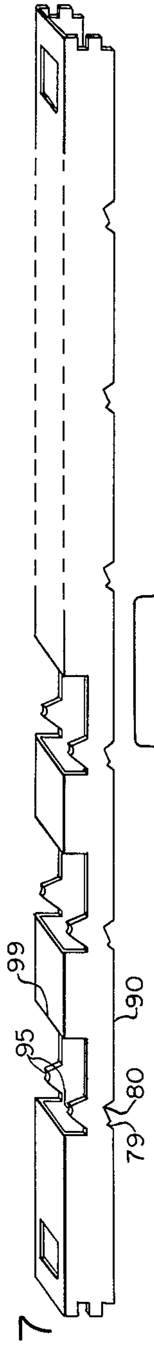
FIG. 7 is a perspective view of a key strip mounting.
Figures 5, 6, 11:
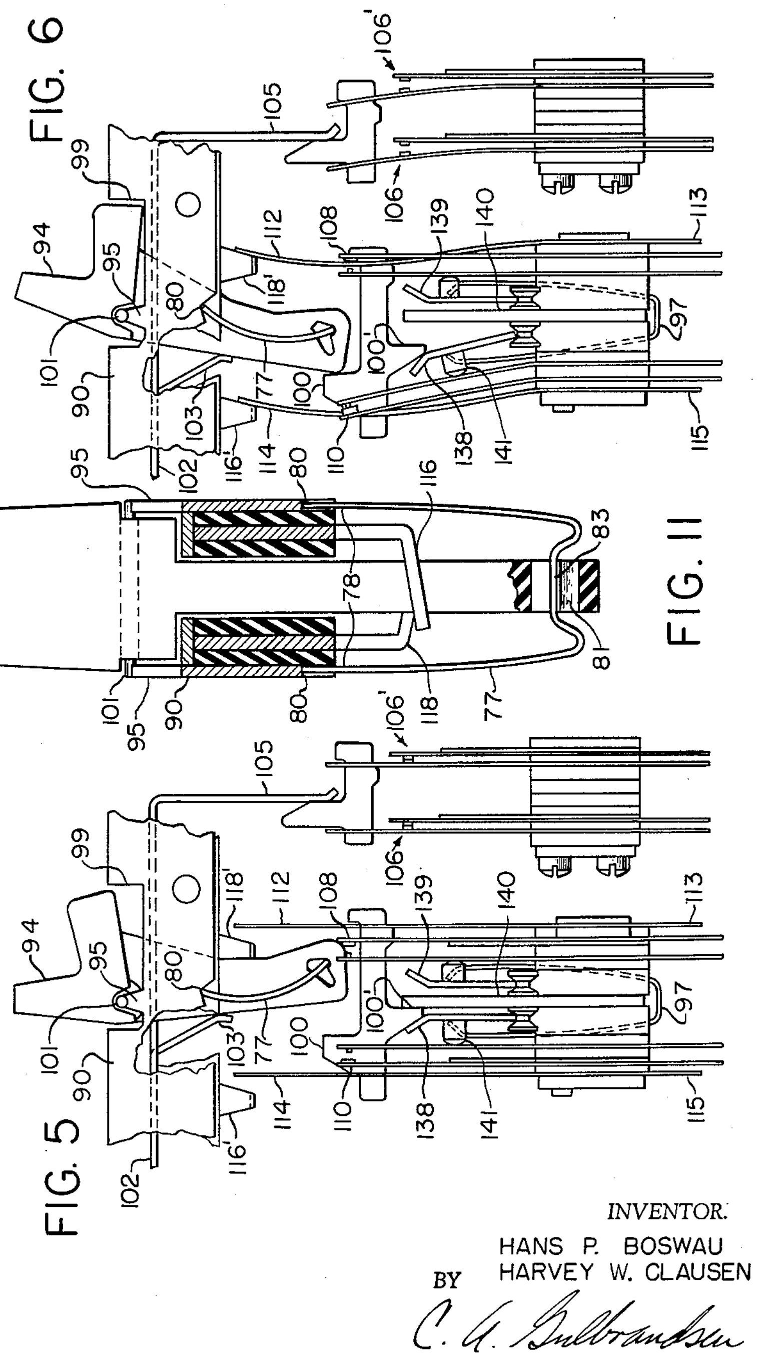
FIG. 5 is a side view of a single station or trunk key with its associated switch actuating components shown in the unactuated or idle position.
FIG. 6 is a view of the elements of FIG. 5 shown in the actuated or busy position.
FIG. 11 is an enlarged front view, partly in section, of the toggle key arrangement.

In FIG. 3 there is shown a station key strip 89 having plurality of toggle keys, representative of the key strips of stations S7 to S18 inclusive, for example station S8, which includes ringing key R48, station key 94 common to channel C25, and station key 98 common to channel C21. The three omitted keys and toggle keys 94 and 98 are all common to station S8 and are similarly mounted in a U-shaped member or strip mounting 90 (shown in detail in FIG. 7). The mounting 90 has spaced recesses 99 extending across the width thereof and integral therewith raised portions or projections 95 providing bearing surfaces for the pivots 101 of the toggle keys. Each toggle key has an upper manually actuatable portion and a lower extended or actuating portion. The actuating portion is provided with a retaining surface or slot 81 having two notches or depressions 82 and 83. Opposite each recess 99 there is located a corresponding retaining surface formed with a pair of notches or depressions 79 and 80 disposed on both sides of the mounting 90. Note, that the notches 79 and 80 are positioned so that notch 80 is substantially along a line between pivot 101 and depression 83 when the toggle key is approximately intermediate between its two limits of movement, and so that notch 79 is always to the left of that line irrespective of the toggle key position. A U-shaped spring member 77, having legs 78 engageable with either notch 79 or 80, is compressibly retained within the slot 81. The depressions 82 and 83 of slot 81 are provided to permit easy assembly of the toggle keys within the mounting 90. The lower depression 82 allows the spring 77 to be slightly compressed while retaining the toggle key 94 and its pivot 101 against the bearing radius of projection 95 during the initial stages of assembly. The upper depression 83 is the final retaining surface of the spring 77 and movement of the lower portion of spring 77 up to the depression 83 increases the compression of spring 77 to firmly lock the assembly into position (FIG. 11). The key strip assembly 89 of station S8 and its identical counterpart strips of the remaining stations and trunks are removably contained within guide bars 87 and 88 which permits the strips to be substituted by blank strips in the event lesser numbers of stations and/or trunks are required. Also the unitary construction of the strips and keys permits the use of identical parts in a reverse order in adjacent strips to utilize minimum space. These features result in a switchboard of compact design readily acceptable for use in an office or switchboard location compatible with existing office equipment.

With the unitary assembly as herein described it will be obvious that with removal of a key strip and the insertion of a blank strip, i.e., similar to strip mounting 90 but without the recesses 99, the switchboard is capable of expansion or contraction to encompass different extension or station requirements within the limits determined by the cooperating channel components and the traffic requirements. Thus, if initially the switchboard has a capacity for five trunks and twenty extensions or stations, it can be reduced to three trunks and twelve stations by removing two trunk strips and eight station strips, substituting blank strips therefor. Later, if traffic requirements increase, the switchboard can be expanded to full capacity by replacement of the two trunk and eight station strips or lesser numbers thereof. It will be noted that the lower channel components which cooperate with the removed key strips are rigidly contained, but unactuatable, during the contraction phases of usage.

Figures 4, 12:
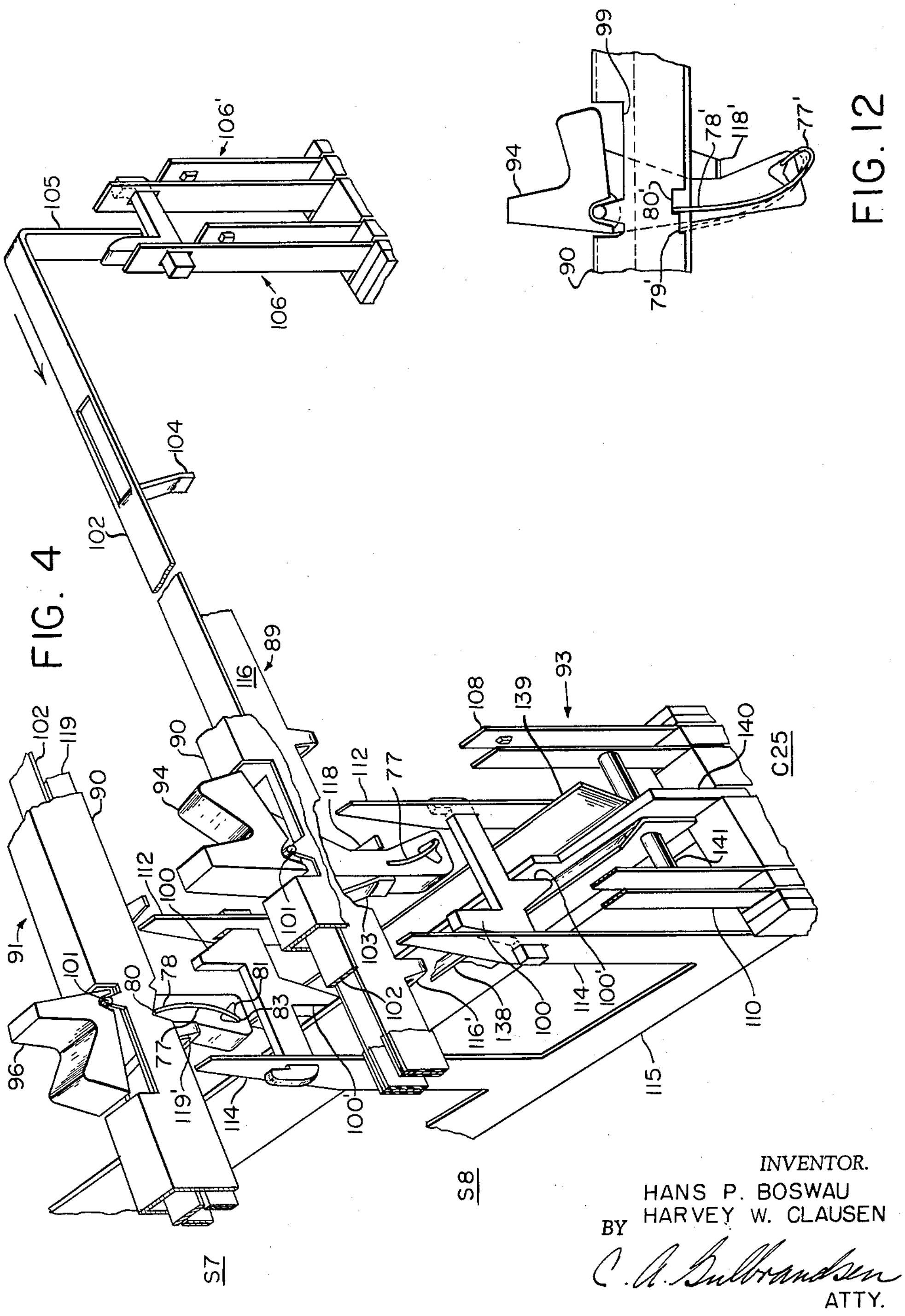
FIG. 4 is a perspective view of a portion of the switchboard illustrating the key switching multiple arrangement.
FIG. 12 is a side view of a modification of the toggle key arrangement.

Referring now to FIG. 4 there is shown a fragmentary but representative portion of the switchboard illustrating the relationship between the keys and the mechanical components for actuating various multiple and single switches. It will be assumed that the key strips 89 and 91 are representative of any two adjacent stations or trunks, the separation therebetween exaggerated to emphasize details of construction, the toggle keys 94 and 96 representative of all the trunk or station keys of trunks and stations, T2 through S18, and the channel assembly 93 representative of any one conversation channel of channels C21 through C25. For example in FIG. 4 the channel described may be channel C25, key strip 89 may be station S8, and key strip 91 may be station S7. The toggle keys 94 and 96 are shown in the idle or unactuated position relative to their associated components. The following description with respect to toggle keys 94 and 96 applies equally as well to each other and the other trunk and station keys not shown. The keys 94 and 96 are mounted as previously described with reference to FIG. 3. The lower ends of the keys 94 and 96 are engageable with actuators 100 upon movement of key 94 clockwise and key 96 counterclockwise from their present positions and around pivots 101. The actuators 100 are biased in the position shown by prestressed contact springs 112 and 114 and the legs of a U-shaped 97. The spring 97 and its relationship to actuators 100 will be further described in connection with the description of FIGS. 5 and 6. Lower prongs 100′ of the actuators 100 are engageable with corresponding channel bars 138 and 139 which extend horizontally across the keyboard in juxtaposition to all the station and trunk strips. Each of the channel bars 138 and 139 is co-operatively associated with alternate keys of a channel to accommodate the reversely alternating arrangement of keys and key strips. More specifically, channel bar 138 is actuated by prong 100′ of the actuator 100 which is individual to key 94 of station S8 or any of the keys of stations S10, S12, S14, S16 and S18 which are common to channel C25. Similarly, channel bar 139 is actuated by key 96 of station S7, by means of its actuator 100 or by any of the keys of stations S9, S11, S13, S15, S17 and A30 (attendant's station key A35), which are common to channel C25. It will be understood that a description of co-operating parts in reference to channel bar 138 applies equally to other channel bars, such as bar 139 (though oppositely located) and the bars of other channels C21 through C24. In FIGS. 4, 5 and 6 the prong 100′ of actuator 100 extends into a V-shaped area formed by the bar 138 and a rigid center support member 140. The legs of spring 97 maintain the bars 138 and 139 biased against the prong 100′ and member 140. Movement of prong 100′, as illustrated in FIG. 6, results in pivotal actuation of bar 138 counterclockwise, which in turn closes contacts 110 (partially shown in FIG. 4) through a pin 141 attached to the bar 138.

Figures 8, 9, 10:
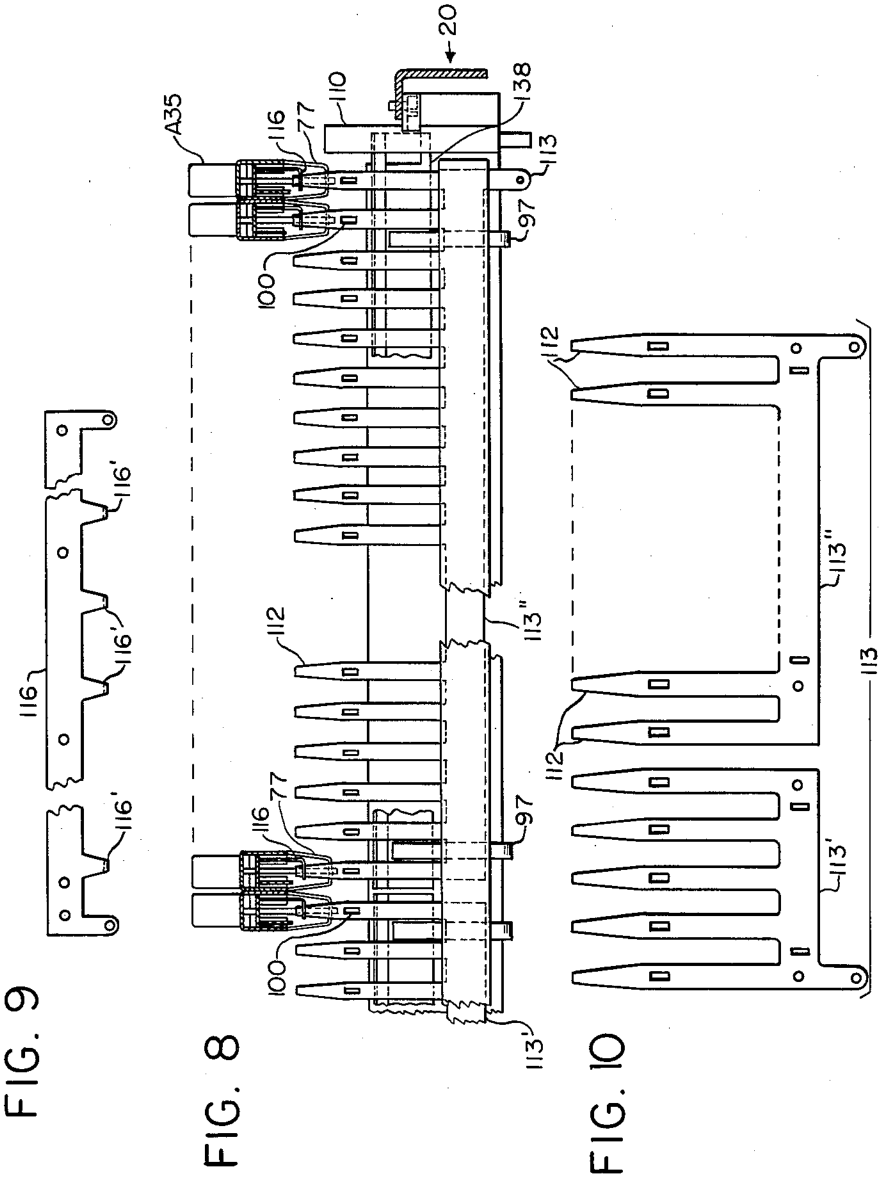
FIG. 8 is a partial front view of the keyboard, taken along the lines VIII—VIII of FIG. 1.
FIG. 9 is a plan view of a trunk or station multiple conductor.
FIG. 10 is a composite plan view of the conversation channel multiple conductor including the trunk and station portions.

In FIGS. 5 and 6 the details of the bars 138 and 139 with their related members are shown. Two sets of make contacts 110 and 108 are provided for operation by the corresponding channel bars 138 and 139, respectively. These make contacts are arranged electrically in parallel to perform like switching functions. The channel multiples 113 and 115 are strip-type electrical conductors having a plurality of upright contact springs 112 and 114, respectively (FIG. 10). These channel multiple conductors are connected to wires which lead to channel battery feed 120 as illustrated diagrammatically in FIG. 13. The station multiples 116 (FIG. 9) and 118 are identical but oppositely mounted strip-type electrical conductors having a plurality of contacts 116' and 118' which are engageable with contact springs 114 and 112, respectively. The station multiples are connected by wires to the terminal board and thence by lines to station telephones, located exteriorly of the switchboard 1. In like manner, trunk multiples and the attendant's station multiples are connected by wires to the terminal board of the switchboard and thence by lines to trunks and the attendant's telephone, respectively. Each trunk and station multiple conductor is identical to the conductor 116 and each channel multiple conductor is identical to channel conductor 113. Note, that pairs of station and trunk multiple conductors such as 116—118, channel multiple conductors 113 and 115, adjacent actuators 100 in the same channel, channel bars 138 and 139, and adjacent strip mountings 90 are identical pieces, but reversely located with respect to one another in the switchboard. Thus, they represent standard and interchangeable parts to facilitate assembly and maintenance.

In each trunk and station key strip there is located a longitudinally disposed sliding bar actuator 102 which extends from channel C25 to an extension 105 located beyond channel C21. Each actuator 102 has downwardly extending tabs, for example tabs 103 and 104 of FIG. 4, each of which is engageable with the lower extended portion of a toggle key, such as key 94. The extension 105 of actuator 102 is movable by any key of its key strip, with the exception of the lowermost key of the hold and ringing keys row, to operate a switch mechanism, for example, break contacts 106 and 106' of station S8.

Thus each station and trunk key, such as toggle key 94, is capable of performing three switching functions; one, connecting station or trunk multiple conductors 116 and 118 to channel multiple conductors 113 and 115 independently of other keys, two, controlling break contacts 106 and 106' in common with the other keys of its station or trunk strip, and three, controlling make contacts 108 or 110 in common with other alternate keys of its channel. The multiple switching functions of the representative key 94 is illustrated in FIG. 5 in which the key 94 and its associated mechanism is shown in the idle or unactuated position; with channel multiple conductors 113 and 115 disconnected from station multiple conductors 118 and 116, respectively; make contacts 108 and 110 open circuited; and break contacts 106 and 106' closed. After manual actuation of key 94, the elements assume the position shown in FIG. 6 in which channel multiple conductors 113 and 115 are connected across station multiple conductors 118 and 116, respectively, make contacts 108 and 110 are closed, and break contacts 106 and 106' are opened. To effect this switching action, note that actuator 100 moves to the left against the moderate biasing action of contact springs 112 and 114, but also, at prong 100', against a more considerable spring bias caused by the left leg of spring 97. Thus, the restoration of key 94 results in the left leg of spring 97 moving the prong 100' of actuator 100 to the right which releases contact springs 112 and 114 to return to their prestressed positions, as shown in FIG. 5.

In FIG. 8 there is illustrated a section through a conversation channel, such as channel C25, wherein the keys of channel C25 are shown with respect to the channel multiple conductor 113 and the contact springs 112. The channel multiple conductor 113 of FIG. 10 includes a section 113' common to the five trunk lines of channel C25, and a section 113'' common to the twelve or more stations and attendant's station of channel C25. The channel multiple conductor 113 is separated into two sections to permit insertion of the supervisory relay 124, and its parallel resistor and capacitor (latter three elements shown diagrammatically in FIG. 13). Thus, for channel multiple conductor 115, the sections could be combined physically or electrically connected to effectively result in one channel multiple conductor, but for standardization of parts are electrically connected.

In FIG. 12 a modification of the toggle arrangement is illustrated. A U-shaped spring 77', similar to spring 77 but having longer legs 78', is selectively positioned in a pair of rectangular notches 79' and 80' integral with the sides of strip mounting 90. In the solid line position, the toggle action of key 94 will be effected from one position (shown) to an overcenter or actuated position. Thus the spring bias is exerted in two directions, one, against the contact 118' which limits the movement in the counterclockwise direction, secondly, in the clockwise direction, which is limited by engagement of the key handle abutting the mounting recess 99. In the dotted line position, the bias of spring 77' is exerted in only one direction, counterclockwise, to obtain non-locking action of the key 94.

CIRCUIT DESCRIPTION

Figure 13:
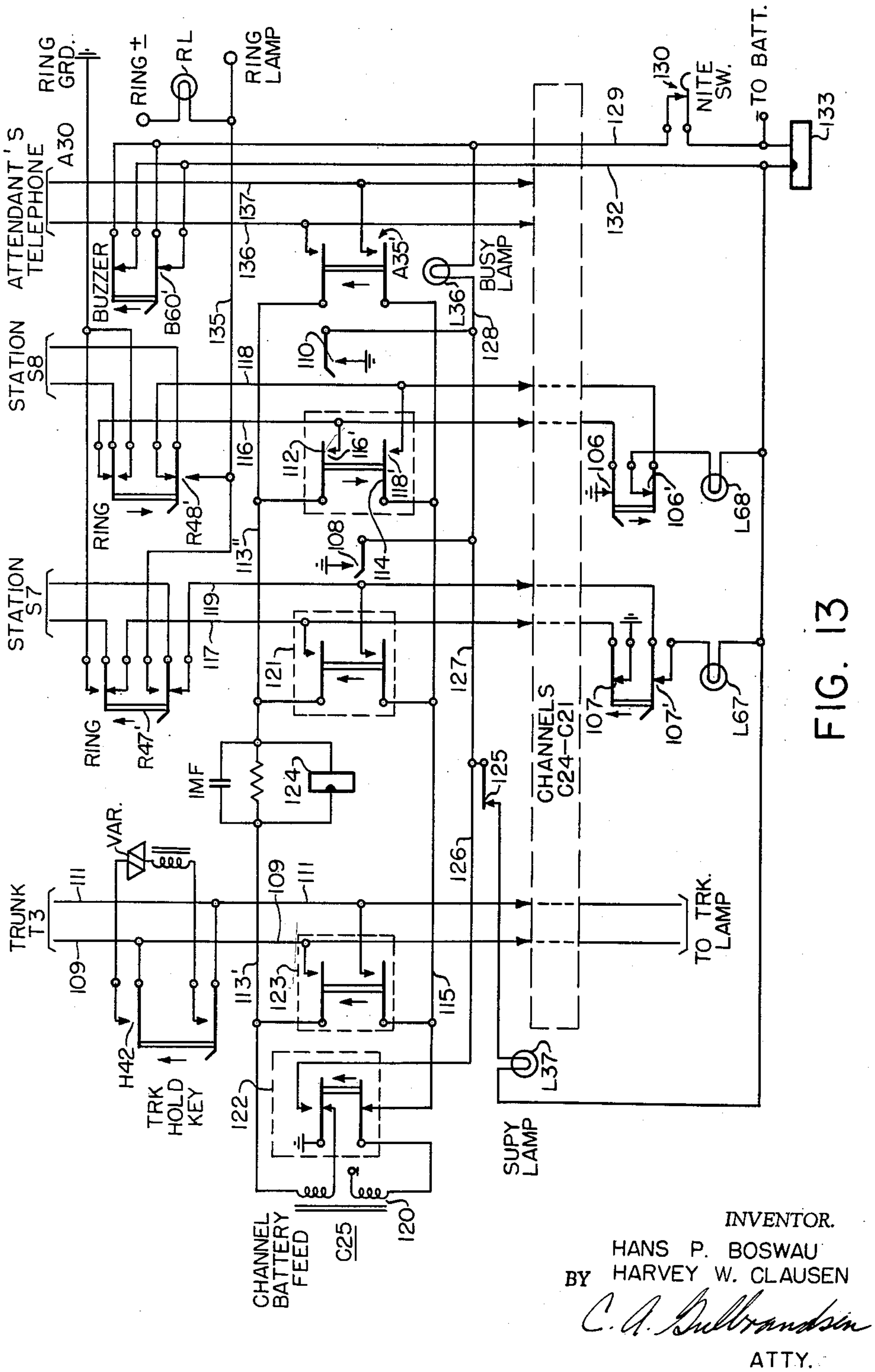
FIG. 13 is a schematic circuit diagram of a representative portion of the switchboard.

The electrical equivalents of the components shown in FIGS. 1 to 12 inclusive are illustrated by the same numbers or by prime numbers in FIG. 13, which describes a representative portion of the schematic circuit diagram of the switchboard 1. One trunk T3, two stations S7 and S8, attendant's answering station A30, and one conversation channel C25 are represented therein. The other trunks, stations and channels are merely duplicate and equivalent circuit components to the ones illustrated. Channel C25 is provided with a battery feed 120 connected to a central power source conveniently disposed relative to the switchboard location. The channel multiple conductors 113 (which include 113' and 113'') and 115 are available to connect the channel battery feed 120 to the parallel circuits for the trunk T3, stations S7 and S8, and the attendant's station A30. The battery feed 120 may be disconnected from the channel multiple conductors 113 and 115 by any trunk key of channel C25, as represented by switch 122, when central office battery feed is required to extend an outside call on the trunk T3 and channel battery feed is not required. Note, that channel multiple conductors 113 and 115 represent the conversation channel C25 which is the circuit path for linking line conductors from a calling party (either trunk or station) to line conductors from a called party (either trunk or station). The trunk multiple conductors 109 and 111 connect the trunk lines of trunk T3 to the switchboard circuit. The trunk multiple conductors 109 and 111 are connectible across the channel multiple conductors 113 and 115 by means of trunk switch 123 which is actuated by the trunk key common to both trunk T3 and channel C25. Thus both switches 122 and 123 are actuated by the same trunk key, even through switch 122 may also be actuated by the other trunk keys common to channel C25. Similarly station S7 has station multiple conductors 117 and 119 which cannot with lines to the S7 telephone. The station multiple conductors 117 and 119 are connectible to the channel multiple conductors 113 and 115 by means of switch 121, which is actuated by the station key of S7 individual to channel C25. Also, in like manner, the station multiple conductors 116 and 118 of station S8 are connectible across the channel multiples 113 and 115, but by means of the station key of S8 individual to channel C21. The mechanical features of this station S8 are illustrated in FIGS. 4, 5 and 6. The station multiple conductors 136 and 137 of attendant's station A30 are similarly connectible across the channel multiple conductors 113 and 115 by means of a switch A35' actuated by key A35. Note, that switches 121, 123 and A35' though diagrammatically represented in FIG. 13 are structurally identical to the switch components heretofore described in connection with key 94 which include contact springs 112 and 114, and multiple 116 with its contacts 116′.

The winding of a supervisory relay 124 is connected in series with channel multiple conductor 113 to control break contacts 125. Contacts 125 control the energization of supervisory lamp L37. The lamp L37 has three parallel paths to ground through the contacts 125; first by conductor 126 and contacts of switch 122, second by conductor 127 and contacts 108, and third by conductor 127 and contacts 110. Contacts 108 are actuatable by any station key of the odd group of stations, for example station S7, which is common to channel C25. Contacts 110 are actuatable by and station key of the even group of stations, for example station S8, which is common to channel C25. A busy lamp L36 is similarly connected to the above three ground circuits by conductor 128. The lamp L36 is connected through a conductor 129 and nite switch 130 to battery. The lamp L37 is connected to battery by conductor 131 and either of two parallel paths; one, by conductor 132, buzzer break contacts B60′, conductor 129 and nite switch 130; or two, by buzzer relay winding 133, which is normally shunted by the buzzer switch B60′, conductor 129 and nite switch 130. Ringing current of the stations S7 and S8 is provided by conductors 134 and 135 connected to a convenient source of power. A non-locking ringing switch R48′ actuated by ringing key R48 is provided to temporarily disconnect the station multiple conductors 116 and 118 from station S8 and to connect the ringing circuit to station S8. Similarly, ringing switch R47′ accommodates station S7 in like manner. The initial calling circuit for station S8, providing the means for energizing the station indicating lamp L68 is traceable from ground, through break contacts 106 to conductor 116, the upper set of break contacts of ringing switch R48′, the loop through the telephone of station S8, the lower set of break contacts of ringing switch R48′, conductor 118, through break contacts 106′, lamp L68, conductor 131 and either of the parallel circuits to battery, described above in connection with lamp L37. Break contacts 106 and 106′ are actuatable by any key of station S8 to extinguish the lamp L68 after its indicating function is succeeded by attendant action. With the exception of the switches operated by ringing keys R47 to R58 inclusive all switches described herein are over-center toggle type switches having a positive off and a positive on position, i.e. locked switches (for example, the positions determined by the solid line position of spring 78′ in FIG. 12). The switches operated by the ringing keys are spring biased in only one direction which upon manual release revert to their original position, i.e., non-locking switches (for example the position determined by the dotted line position of spring 78′ in FIG. 12).

OPERATION

*Situation I*

Calling party—station S8
Called party—station S7

With a call emanating form station S8 the removal of the handset from the cradle at that station completes a circuit as follows, from ground through the break contacts 106, station multiple conductor 116, upper break contacts of switch R47′, the loop at the handset, through lower break contacts of switch R47′, station multiple conductor 118, break contacts 106′, lamp L68, conductor 131, conductor 132, break contacts of switch B60′, conductor 129, nite switch 130, to battery. The latter circuit from conductor 132, assumes that the attendant is relying upon the visual indications provided by the lower horizontal row of lamps L62 through L76, and that the buzzer relay winding 133 is shunted. The station lamp L68, being lighted, alerts the attendant with respect to station S8. As an auxiliary audible aid in this respect, in the event the attendant is absent or engaged in other work, the buzzer may be actuated by means of key B60 which opens the switch B60′. Then the above calling circuit from station S8 is completed through the buzzer relay winding 133 to battery. The buzzer relay winding 133 operates a buzzer (not shown) to furnish an audible signal from the switchboard 1 to indicate that switchboard attention is required. After ascertaining the calling station, the attendant by visual inspection of the busy lamps (L36 for example) determines an available conversation channel (connecting circuit C25 for example). The busy lamp L36 is extinguished because none of the circuits to ground is closed, i.e., through switches 108, 110 and 122 (as shown in FIG. 13). The attendant operates key A35 and key 94 to place the calling station S8 and attendant's answering station A30 across the channel multiple conductors 113 and 115 by closure of contacts (112—116′), (114—118′) and the contacts of switch A35′. Simultaneously contacts 106 and 106′ are opened, extinguishing the station lamp L68, and make contacts 108 are closed thereby connecting busy lamp L36 to ground and battery, thereby indicating a busy condition of channel C25. The supervisory lamp L37 is not lighted because switch 125 is open circuited by the energization of relay winding 124. Relay winding 124 is energized concurrent with the completion of a loop extending from channel multiples 113 and 115 through either station S8 or the attendant's station A30.

The attendant answers the calling party S8 to determine the called party, in this situation, station S7. The answering circuit may be traced from channel multiple conductors 113 and 115 through the contacts of switch A35′ to the attendant's station multiple conductors 136 and 137 and to the attendant's handset. The attendant operates the station key 96 or S7 which key corresponds to channel C25 to extend the call to the called party. Then the attendant rings the called party S7 by depressing the ringing key R47 to operate switch R47′ which provides ringing current by circuit conductors 134 and 135 to the ringer in the telephone located at station S7.

After the called party S7 answers, the attendant's telephone is removed from the connection by restoring the key A35. When both parties have disconnected, no loop exists, and the channel supervisory relay winding 124 releases, closing the circuit through contacts 125 to light the supervisory lamp L37. This visual signal to the attendant indicates the completion of the call and the attendant restores both station keys, which opens the ground circuit of lamps L36 and L37 through contacts 108 and 110.

*Situation II*

Calling part—S8
Called party—T3 and central office attention

After receipt of the call from station S8, in the above described manner, the attendant selects an available trunk, for example T3, and operates the key of T3 individual to the selected channel C25. The trunk key, by means of switch 123 connects the trunk multiple conductors 109 and 111 in circuit with the channel multiple conductors 113 and 115, moves switch 122 into the upper position to disconnect the channel battery feed 120 and disconnect the ground circuit (not shown) for the trunk lamp L63 (FIG. 1). The upper position of switch 122 provides a ground connection for the channel busy lamp L36 and through contacts 125 a ground connection for supervisory lamp L37. Upon energization of relay winding 124, the break contacts 125 open, extinguishing the supervisory lamp L37. With the connection completed to central office and relayed from there to the desired party, the central office battery provides the power for the conversation circuit until completion of the call. Upon completion of the call, the supervisory lamp L37 is lighted by closure of contacts 125 through release of relay winding 124. Thus both lamps L36 and L37 are lighted providing visual indication of a completed call and, the requirement for attendant action. The attendant restores the trunk and station keys which extinguishes both lamps L36 and L37 and makes available the channel C25 for succeeding calls.

*Situation III*

Calling party—T3 from central office
Called party—S8

An incoming call from the central office will be indicated by lighting of a trunk lamp L62 to L66 which corresponds to the calling trunk, for example lamp L63 of trunk T3. This trunk lamp L63 is energized from central office battery through trunk multiple conductors 109 and 111. The attendant answers the call by connecting the trunk T3 into an available channel, such as C25, and through the attendant's key A35, connects the attendant's station A30 to the same channel. Thus switches 123 and A35′ are moved to their upper contact make positions. As previously described, the closure of switch 122 (conjointly operated with 123 by the trunk key) removes channel battery feed from the channel circuit and substitutes therefor central office battery. The channel busy lamp L36 is lighted through a ground connection completed by switch 122. After ascertaining the called party, in this situation station S8, the attendant rings station S8 by operating non-locking key R48, and operates the key 94 of S8 individual to channel C25 to complete the call. Restoring the keys after cessation of conversation, again prepares the circuit for succeeding calls.

Obviously other situations may be provided to accommodate further services but the situations described above exemplify typical applications or requirements of the switchboard. It will be understood that the number of stations and trunks would be limited chiefly by the traffic requirements of the particular application or system.

What is claimed is:

1. In a toggle arrangement for a manual key operated switchboard, a substantially U-shaped inverted-channel member including an upper base and downwardly extending sides therefor, a recess in said member extending across the base thereof, raised bearing surfaces within said recess formed in the upper exposed edges of the sides of said member, a key having a pivot engageable with said bearing surfaces, said key having an extended portion provided with a slot, a manually actuatable portion on said key, said actuatable portion and said extended portion substantially diametrically opposed relative to said pivot, a retaining surface in the lower edge of the sides of said member disposed between said pivot and said slot, and a spring member having one end engageable with said slot and an opposite end engageable with said retaining surface to hold said key in place on said bearing surfaces and to provide the toggle means for said key.

2. In a toggle arrangement as claimed in claim 1 in which said slot has two spring retaining depressions and said member retaining surface has two spring retaining depressions such that the overcenter distribution of said spring member is variable according to the placement of the ends of said spring within said depressions whereby said key may be made locking or non-locking in the operated position.

3. In a toggle arrangement for a manual key operated switchboard, a substantially inverted U-shaped channel member including an upper base portion and downwardly extending sides therefor, a recess in said member extending across the base thereof, bearing projections formed within said recess in the upper exposed edges of the sides of said member, a key having a pivot engageable with said projections, said key having an actuatable portion and an actuating portion oppositely disposed relative to said pivot, said actuating portion having a slot, a pair of notches formed in the lower edges of the opposite sides of said member and disposed between said pivot and said slot, and a U-shaped spring member having its base portion retained within said slot and its legs retained within said notches, said spring member having legs longer than the distance between said slot and said notches whereby spring compression is exerted between said slot and said notches to retain said key within said recess.

4. In a toggle arrangement as claimed in claim 3 in which said notches include two steps, one step disposed substantially between and along a line extending from said pivot and said slot, and a second step disposed substantially between but not along said line, whereby said legs retained in said one step provide overcenter toggle action of said key and in said second step provide spring biasing action in one direction of said key.

5. In a toggle arrangement for a operator's keyboard, a toggle member, a mounting strip having an arcuate bearing surface on one side thereof for pivotally supporting said member thereon, a substantially U-shaped spring, a pair of notches on said mounting strip for retaining the legs of said spring, a retaining surface on said toggle member for retaining the base of said spring, said pair of notches and said retaining surface disposed on the side of said mounting strip opposite said bearing surface whereby said spring exerts a force tending to hold said toggle member against said bearing surface.

6. In a toggle arrangement as claimed in claim 5 having another pair of notches on said mounting for retaining the legs of said spring, said legs in one pair of notches biasing said toggle member in one direction, and said legs in another pair of notches biasing said toggle member in two directions from an overcenter position.

7. In a telephone operator's keyboard, a plurality of key strips arranged in rows corresponding to lines, a plurality of connecting circuits disposed below and athwart said key strips, a lever key on each key strip for each said connecting circuit, a pair of first insulated metal strips built into each said key strip and connected to the corresponding line, a pair of second insulated metal strips built into each said connecting circuit, projections extending from said metal strips at the intersections of said key strips and said connecting circuits, and mechanical means responsive only to the operation of any one of said keys for moving the associated pairs of projections into conductive engagement, whereby a conductive connection may be established between any two of said lines via any one of said connecting circuits.

8. In a telephone operator's keyboard, a plurality of key strips arranged in rows corresponding to lines, a plurality of connecting circuits disposed below and athwart said key strips, a lever key on each key strip for each said connecting circuit, a pair of common conductive members integral with each key strip and connected to one of said lines, a pair of common conductive cross members integral with each said connecting circuit, a projection on each said key strip member for each said connecting circuit, a projection on each said cross member for each said key strip, individual non-conductive actuators interlinking said last named projections in pairs below each key location, an extension for each key disposed adjacent the associated actuator so that operation of the key moves the actuator, and said actuator moves the associated cross member projections into contact with the corresponding key strip projections to complete a connection between the corresponding line and the corresponding connecting circuit.

9. In a telephone operator's keyboard, a plurality of key strips arranged in rows corresponding to lines, a plurality of connecting circuits disposed below and athwart said key strips, a lamp signal in said keyboard for each of said lines and said connecting circuits, a lever key on each key strip for each connecting circuit, a pair of common conductive members integral with each key strip and connected to said lines, a pair of common conductive members integral with each connecting circuit, a first actuator individual to each key, a second actuator common to each key strip, a third actuator common to each connecting circuit, means responsive to the operation of any key for causing said key to move the associated individual and common actuators, contacts operated responsive to such movement of such first actuator for connecting the associated line to the associated connecting circuit via said common conductive members, contacts operated responsive to said movement of said second actuator for controlling the associated line lamp signal, and contacts operated responsive to said movement of said third actuator for controlling the associated connecting circuit signal.

10. In an operator's keyboard as in claim 9, means mounting said second actuators integrally with said key strips, and said first and third actuators with said connecting circuits, said key strips and said first and third actuators independently mounted so as to enable any key strip to be lifted out of place and replaced by a blank strip while maintaining all parts of said connecting circuits undisturbed.

11. In a toggle arrangement for an operator's keyboard, a manually operable toggle member, a mounting plate having an opening therein for the insertion of said toggle member, an upper face and an under side for said mounting plate, arcuate bearing surfaces in the upper face of said mounting plate for pivotally supporting said toggle member in said opening with a portion above and a portion below said mounting plate, a slot in the lower portion of said toggle member, a retaining notch on each side of said opening in said mounting plate, on the under side thereof and below said bearing surfaces, a two-legged spring compressibly retained between said retaining notches and said slot whereby said toggle member is held down on said bearing surfaces by the outward tension of said spring alone.

12. In a telephone operator's keyboard, a plurality of key strips arranged in rows corresponding to lines, common conductive line members integral with said key strips and connected to said lines, common conductive cross members comprising connecting circuits disposed below and athwart said key strips, a key on each key strip for each said connecting circuit, mechanical means operated responsive to the operation of any of said keys for connecting the associated line to the associated connecting circuit via the respective conductive members, said last means comprising independent actuators for said key strips and said connecting circuits whereby the normal relationship of said key strips and keys to said connecting circuits is one of juxtaposition such that any key strip can be lifted out as a unit without disturbing any element of any of said connecting circuits.

13. In an operator's telephone keyboard, a plurality of adjacent rows of lever two-position keys for connecting calling and called lines, said keys also arranged in a plurality of transverse rows representing a plurality of channels for making said connections, with the keys of each said transverse row mounted on narrow centers, and means locking said keys against overthrow to enable the keys of alternate ones of said adjacent rows to be mounted for operation in opposing senses, so, that operation and restoration of any key by an operator's index finger will not disturb the neighboring keys.

14. An operator's keyboard as in claim 13, wherein said keys are identical, wherein the keys of said adjacent rows are mounted on identical key strips and said key operation in opposing senses is achieved by mounting the alternate ones of said key strips in reverse orientation in said keyboard.

15. In a telephone operator's keyboard, a plurality of key strips arranged in rows corresponding to lines, common conductive line members integral with said key strips and connected to said lines, common conductive cross members comprising connecting circuits disposed below and athwart said key strips, a key on each key strip for each said connecting circuit, mechanical means operated responsive to the operation of any of said keys for connecting the associated line to the associated connecting circuit via the respective conductive members, said last means comprising independent actuators for said key strips and said connecting circuits, said connecting-circuit actuators being removably and reversibly attached to a related pair of said conductive cross members, to enable alternate ones of said key strips to be operated in opposing senses, by reversing the key strips of every other one of said rows and the corresponding connecting-circuit actuators.

16. In an operator's keyboard, a plurality of adjacent rows of two-positional lever keys, said keys also arranged in transverse rows, operating handles for said keys having rectangular tops of equal heights with said tops aligned in the transverse direction when in the normal position, so that said tops form a seemingly continuous transverse line and move out of said line only when operated, the alternate ones of said adjacent rows of keys being mounted for operation in opposite directions, an inverted channel mounting strip for each row of keys, recesses in the base of said channels for receiving said keys, stop means on said channel preventing the overthrow of said key handles beyond their normal positions so that operation of a key in any row cannot possibly operate either adjacent key of the same transverse row.

17. An operator's keyboard as in claim 16, wherein said key handles are substantially the same width as said channel, and the ends and bottom of said recesses constitute stops against overtravel of said key handles in either direction.

References Cited in the file of this patent

UNITED STATES PATENTS

| | | |
|---|---|---|
| 1,779,058 | Borgmann | Oct. 21, 1930 |
| 1,951,530 | Richter | Mar. 20, 1934 |
| 2,107,158 | Lewis | Feb. 1, 1938 |
| 2,235,714 | Lennon | Mar. 18, 1941 |
| 2,395,698 | Tiffany | Feb. 26, 1946 |
| 2,742,535 | Blackhall | Apr. 17, 1956 |